United States Patent
Kimura et al.

(10) Patent No.: US 7,991,231 B2
(45) Date of Patent: Aug. 2, 2011

(54) METHOD AND APPARATUS FOR DETERMINING WHETHER IMAGE CHARACTERS OR GRAPHICS ARE HANDWRITTEN

(75) Inventors: Kenji Kimura, Nara (JP); Makio Gotoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1359 days.

(21) Appl. No.: 11/518,150

(22) Filed: Sep. 11, 2006

(65) Prior Publication Data

US 2007/0211946 A1    Sep. 13, 2007

(30) Foreign Application Priority Data

Sep. 22, 2005   (JP) ................................. 2005-276334

(51) Int. Cl.
*G06K 9/00* (2006.01)

(52) U.S. Cl. ....................................... 382/187; 382/108

(58) Field of Classification Search .................... 382/187
See application file for complete search history.

(56) References Cited

U.S. PATENT DOCUMENTS

| | | | | |
|---|---|---|---|---|
| 4,998,626 A * | 3/1991 | Ota | ................ | 382/102 |
| 5,025,475 A * | 6/1991 | Okabe | ............ | 382/101 |
| 5,666,443 A * | 9/1997 | Kumashiro | .......... | 382/266 |
| 5,682,439 A * | 10/1997 | Beernink et al. | ........... | 382/187 |
| 5,872,864 A | 2/1999 | Imade et al. | | |
| 6,445,831 B1* | 9/2002 | Arai | ............... | 382/254 |
| 6,643,401 B1* | 11/2003 | Kashioka et al. | .......... | 382/197 |
| 6,654,490 B2* | 11/2003 | Love | ........... | 382/154 |
| 2002/0114508 A1* | 8/2002 | Love | .......... | 382/154 |
| 2002/0135786 A1* | 9/2002 | Ma et al. | ........ | 358/1.1 |
| 2002/0176619 A1* | 11/2002 | Love | ........... | 382/154 |
| 2003/0215136 A1* | 11/2003 | Chao et al. | ........ | 382/176 |
| 2004/0240736 A1* | 12/2004 | Karidi et al. | .......... | 382/176 |

FOREIGN PATENT DOCUMENTS

| | | |
|---|---|---|
| JP | 7-99581 A | 4/1995 |
| JP | 10-162102 A | 6/1998 |
| JP | 2001-61061 A | 3/2001 |
| JP | 2003-110854 A | 4/2003 |

* cited by examiner

*Primary Examiner* — David P Zarka

(74) *Attorney, Agent, or Firm* — Birch, Stewart, Kolasch & Birch, LLP

(57) ABSTRACT

An image processing apparatus and method for capturing an image including characters or graphics, determines whether or not the characters or graphics included in the captured image are prepared by handwriting based on a magnitude of a density gradient in a direction crossing an edge for characters or graphics included in the image, and applies processing to the image in accordance with the result of the determination.

7 Claims, 16 Drawing Sheets

FIG. 2 is possible to transfer data at high speed compare the time for taking a photo is obvious difference, successively image became capable of better still, with the two USB modes scribble FIG. 3A
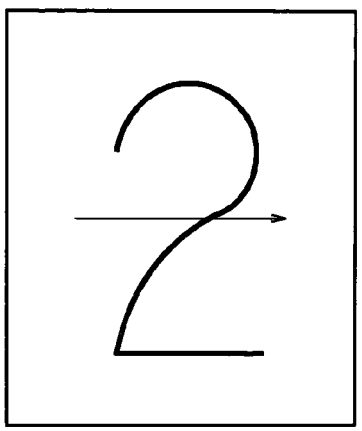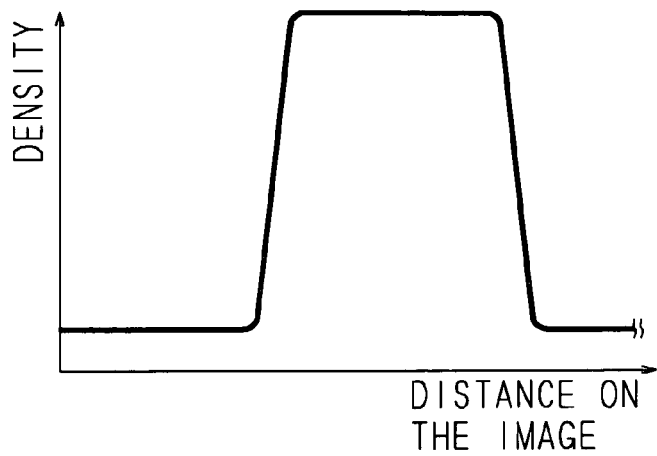
FIG. 3B
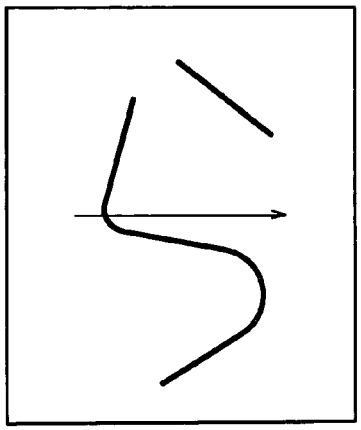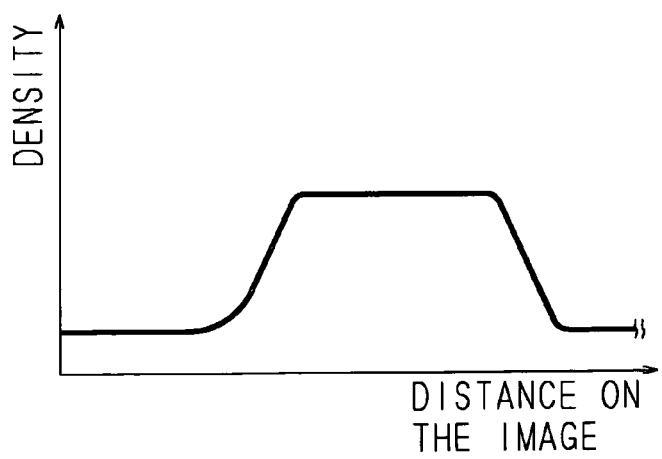

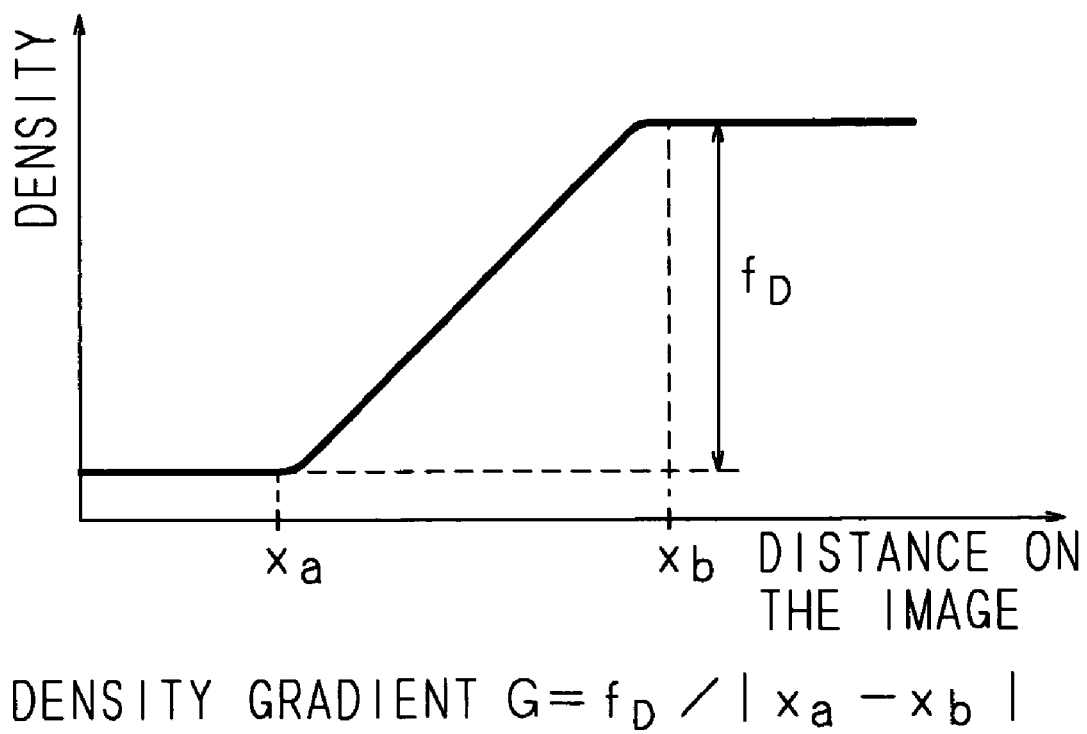

$$\text{ACUTANCE } A = \left\{ \frac{1}{n} \sum_{i=1}^{n} \left( \frac{\Delta f_i}{\Delta x} \right) \right\} / f_D$$

| $x_i$ | ... | 9 | 10 | 11 | 12 | 13 | 14 | 15 | 16 | ... |
|---|---|---|---|---|---|---|---|---|---|---|
| $f(x_i)$ | ... | 19 | 20 | 32 | 72 | 105 | 118 | 122 | 122 | ... |

DENSITY GRADIENT $G = (f_b - f_a) / (x_b - x_a)$
$= (118 - 20) / (14 - 10)$
$\fallingdotseq 25$

DISTANCE ON THE IMAGE

| $x_i$ | ... | 9 | 10 | 11 | 12 | 13 | 14 | 15 | 16 | ... |
|---|---|---|---|---|---|---|---|---|---|---|
| $f(x_i)$ | ... | 21 | 19 | 24 | 54 | 140 | 190 | 203 | 206 | ... |

DENSITY GRADIENT $G = (f_b - f_a) / (x_b - x_a)$
$= (203 - 24) / (15 - 11)$
$\fallingdotseq 45$

FIG. 13 is possible to transfer data at high speed compare the time for taking a photo is obvious difference, successively image became capable of better still, with the two USB modes scribble

FIG. 14 is possible to transfer data at high speed compare the time for taking a photo is obvious difference, successively image became capable of better still, with the two USB modes scribble

METHOD AND APPARATUS FOR DETERMINING WHETHER IMAGE CHARACTERS OR GRAPHICS ARE HANDWRITTEN

CROSS-REFERENCE TO RELATED APPLICATIONS

This Nonprovisional application claims priority under 35 U.S.C. §119(a) on Patent Application No. 2005-276334 filed in Japan on Sep. 22, 2005, the entire contents of which are hereby incorporated by reference.

BACKGROUND OF THE INVENTION

1. Field of the Invention

The present invention relates to an image determination method that determines whether or not characters or graphics included in an image are prepared by handwriting, an image processing apparatus that applies processing to the image in accordance with a determination, and an image outputting apparatus that outputs the image thus processed.

2. Description of Related Art

There is a publicly-known method in which the image of an original is optically read, and handwritten characters and printed characters included in the image thus read are determined and extracted. For example, in Japanese Patent Laid-Open No. 10-162102, whether or not the character is handwritten is determined by extracting a thickness of a stroke, linearity, and angle. Also, in Japanese Patent Laid-Open No. 11-265424 and Laid Open No. 5-189604, whether or not the character is handwritten is determined by using the shape and size, and linearity of binarized data. Also, in Japanese Patent Laid-Open No. 7-93466, whether or not the character is handwritten is determined by using the linearity of the binarized data. Further, in Japanese Patent Laid Open No. 4-190473, whether or not the character is handwritten is determined by binarizing image data and using its pattern.

However, in the method disclosed in Japanese Patent Laid Open No. 10-162102, it is necessary to extract the stroke, linearity, and angle of characters, and therefore objects to be determined such as characters need a certain degree of size. Namely, when the character to be determined is small, there is a problem that determination accuracy is deteriorated. In addition, in recent years, the font to be used in the printed character is diversified, and there is also a handwriting like character. When such a kind of font is used, according to the conventional method, there is a high possibility that the character is determined to be a handwritten character, involving the problem of causing deterioration of the determination accuracy to occur.

In addition, according to the method disclosed in the conventional documents such as Japanese Patent Laid Open No. 11-265424, binarization is required in any case, thus involving a problem that a process time is increased. Moreover, it is necessary to add hardware, due to binarization, involving a problem that a manufacturing cost is increased.

BRIEF SUMMARY OF THE INVENTION

In view of the above-described circumstances, the present invention is provided, and an object of the present invention is to provide an image determination method capable of quickly determining a handwritten character without depending on the kind and magnitude of the objects to be determined such as characters, by determining whether or not characters or graphics are prepared by handwriting based on a feature of an edge of the characters or graphics, which are objects to be determined, and an image processing apparatus and an image outputting apparatus.

The image determination method of the present invention is characterized in that the feature of the edge of the characters or graphics included in an image is extracted, and based on the feature thus extracted, whether or not the characters or graphics are prepared by handwriting is determined.

According to the present invention, whether or not the characters or graphics are prepared by handwriting is determined based on the feature of the edge extracted from the characters or graphics to be determined. When the feature of the edge is extracted, binarization, as is performed conventionally, is not necessarily performed, and a process time can be shortened.

The image determination method of the present invention is characterized in that the feature of the edge to be extracted is a magnitude of a density gradient in a direction crossing the edge.

According to the present invention, the magnitude of the density gradient in the direction crossing the edge is extracted as the feature of the edge. Accordingly, by sequentially obtaining a density difference between adjacent pixels, the magnitude of the density gradient of an edge portion is obtained, and the feature of the edge is extracted by easy calculation.

The image determination method of the present invention summarize an incidence of the edge having the same feature out of extracted edges, and determines whether or not the characters or graphics to be determined are prepared by handwriting based on an summarized result.

According to the present invention, the incidence of the edge having the same feature is summarized, and based on the number of appearances thus calculated, whether or not the characters or graphics to be determined are prepared by handwriting is determined. Therefore, the characters or graphics can be determined in accordance with the kind of a captured image.

The image determination method of the present invention is characterized by determining whether or not the objects to be determined are prepared by handwriting, when a threshold value is set for the magnitude of the density gradient, and the magnitude of the extracted density gradient is smaller than the threshold value.

According to the present invention, when the magnitude of the extracted density gradient is smaller than the set threshold value, it is so determined that the characters or graphics to be determined are prepared by handwriting. This makes it possible to determine handwritten characters or graphics by easy calculation.

The image processing apparatus of the present invention comprises an obtaining section for obtaining the image, and a controller designed to extract the feature of the edge of the characters or graphics included in the obtained image, determine whether or not the characters or graphics are prepared by handwriting based on the extracted feature, and apply processing to the image in accordance with a determination result.

According to the present invention, whether or not the characters or graphics are prepared by handwriting is determined based on the feature of the edge extracted from the characters or graphics to be determined. Therefore, when the feature of the edge is extracted, the binarization is not necessarily performed as is conventionally done, and therefore a simplification of a hardware construction becomes possible, and the process time is shortened.

The image processing apparatus of the present invention is characterized in that the feature of the edge to be extracted is the magnitude of the density gradient in the direction crossing the edge.

According to the present invention, the magnitude of the density gradient in the direction crossing the edge is extracted as the feature of the edge. Accordingly, by sequentially obtaining a density difference between adjacent pixels, the magnitude of the density gradient of the edge portion is obtained, and the feature of the edge is extracted by easy calculation.

The image processing apparatus according to the present invention is characterized in that the controller summarized the incidence of the edge having the same feature out of the extracted edges and determines whether or not the characters or graphics to be determined are prepared by handwriting based on the summarized result.

According to the present invention, the incidence of the edge having the same feature is summarized, and based on the summarized result, whether or not the characters or graphics to be determined are prepared by handwriting is determined. Therefore, the determination in accordance with the kind of the obtained image becomes possible.

The image processing apparatus according to the present invention comprises a storage section that stores the threshold value set for the magnitude of the density gradient, and is characterized in that the extracted magnitude of the density gradient and the threshold value are compared, and when the magnitude of the density gradient is smaller than the threshold value, it is so determined that the objects to be determined are prepared by handwriting.

According to the present invention, when the extracted magnitude of the density gradient is smaller than the set threshold value, it is so determined that the characters or graphics to be determined are prepared by handwriting. Therefore, the characters or graphics can be determined by easy calculation.

The image processing apparatus of the present invention is characterized in that when the controller so determines that the characters or graphics are not prepared by handwriting, edge enhancement process is applied to the characters or graphics thus determined.

According to the present invention, when it is so determined that the characters or graphics are not prepared by handwriting, the edge enhancement process is applied. Therefore, it becomes easy to read a part of the printed character such as a typed character.

The image processing apparatus of the present invention is characterized in that when the controller so determines that the characters or graphics are prepared by handwriting, pixel values of the characters or graphics thus determined are changed.

According to the present invention, when it is so determined that the characters or graphics are prepared by handwriting, the pixel values of the characters or graphics thus determined are changed. Therefore, for example, by changing the pixel value to the pixel value of the same color as a background part of the image, a handwritten part can be deleted. In addition, by changing the pixel value to the pixel value of a completely different color from the background part, the handwritten part can be enhanced.

The image processing apparatus of the present invention is characterized in that when the controller so determines that the objects to be determined are prepared by handwriting, character recognition is performed for the objects to be determined, and the objects to be determined are replaced with the characters recognized by the character recognition means.

According to the present invention, when it is so determined that the objects to be determined are prepared by handwriting, the character recognition is performed, and the objects to be determined are replaced with the characters thus recognized. Therefore, handwritten characters are replaced with typed characters.

The image outputting apparatus according to the present invention comprises the image processing apparatus according to any one of the aforementioned invention and the image outputting apparatus outputting the image processed by the image processing apparatus.

According to the present invention, there is provided an output means outputting the processed image, and therefore an application to a scanner, a printer, and a digital multi-function machine is possible.

In the present invention, whether or not the characters or graphics are prepared by handwriting is determined based on the feature of the edge extracted from the characters or graphics to be determined. Accordingly, when the feature of the edge is extracted, the binarization is not necessarily performed, as is conventionally performed, and the process time can be shortened. In addition, it becomes possible to simplify a hardware construction, and therefore it becomes possible to determine handwriting while the manufacturing cost of the device is suppressed to be low.

In the present invention, the magnitude of the density gradient in the direction crossing the edge is extracted as the feature of the edge. Accordingly, by sequentially obtaining the density difference between adjacent pixels, the magnitude of the density gradient of the edge portion is obtained, and the feature of the edge is extracted by easy calculation. Also, according to the present invention wherein the density gradient of the edge is used, determination is possible even for the image of an original with printed characters having thinner density than handwritten characters. Moreover, differently from the conventional method of extracting a feature amount of characters such as the thickness of the stroke, linearity, and angle, comparatively smaller characters can also be determined, and determination accuracy can be enhanced.

In the present invention, the appearance frequency of the edge having the same feature is totaled out of the extracted edges, and whether or not the characters or graphics to be determined are prepared by handwriting is determined based on the summarized result. Accordingly, the determination according to the kind of the obtained image becomes possible. For example, when a user scribbles on the original by handwriting, which is mainly formed of typed characters, number of times of extracting the edge of a part of typed characters is increased and the number of times of extracting the edge of a part of the handwritten characters is decreased. By incorporating such information into a determination condition, the determination accuracy can be improved.

In the present invention, when the extracted magnitude of the density gradient is smaller than the set threshold value, it is so determined that the characters or graphics to be determined are prepared by handwriting. Accordingly, the characters or graphics can be determined by easy calculation, and the process time can be shortened.

In the present invention, when it is so determined that the characters or graphics are not prepared by handwriting, the edge enhancement process is applied. Therefore, it becomes easy to read a part of the printed characters such as typed characters.

In the present invention, when it is so determined that the characters or graphics are prepared by handwriting, the pixel values of the determined characters or graphics are changed. For example, by changing the pixel value to the pixel value of the same color as a background part of the image, the handwritten part can be deleted. Also, by changing the pixel value to the pixel value of completely different color from the background part, the handwritten part can be enhanced.

In the present invention, when it is so determined that the objects to be determined are prepared by handwriting, the character recognition is performed and the objects to be determined are replaced with recognized characters. Therefore, the handwritten characters, etc, can be replaced with the typed characters.

In to the present invention, there is provided the output means that outputs the processed image. Therefore, application to the scanner, printer, and digital multi-function machine is possible.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic view showing an example of an image processed by an image processing apparatus;

FIGS. 3A and 3B are explanatory views explaining an edge observed in a non-handwritten image and a handwritten image;

FIG. 4 is an explanatory view explaining a definition of density gradient;

FIG. 13 is a schematic view of the image obtained by extracting the edge from the image shown in FIG. 2;

FIG. 14 is a schematic view of the image subjected to image processing based on a determination result;

DETAILED DESCRIPTION OF THE INVENTION

Hereafter, the present invention will be specifically explained based on the drawings showing the embodiments thereof.

Embodiment 1

Figure 1:
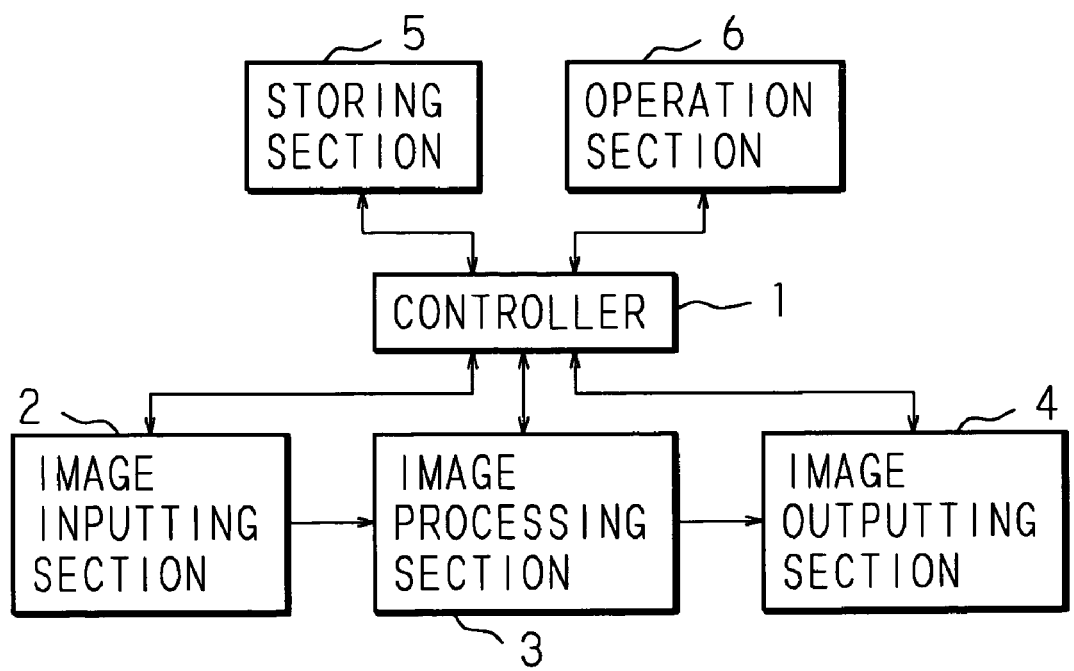
FIG. 1 is a block diagram explaining an internal construction of an image outputting apparatus according to the present invention.

FIG. 1 is a block diagram explaining an internal construction of an image outputting apparatus according to the present invention. The image outputting apparatus of the present invention comprises hardware such as a controller 1, an image inputting section 2, an image processing section 3, an image outputting section 4, a storage section 5, and an operating section 6. The controller 1 is composed of a CPU that controls the aforementioned hardware and a RAM that temporarily holds data, etc, required for control. The storage section 5 is a nonvolatile semiconductor memory, for example, and previously stores a control program for controlling each part of the hardware and a determination program for realizing an image determination method of the present invention. The controller 1 causes an entire apparatus to operate as the image outputting apparatus according to the present invention, by loading the control program and the determination program, etc, from the storage section 5 as needed, and executing the control program and the determination program thus loaded. In addition, the operating section 6 comprises each kind of operating button for receiving an operation command from a user.

The image inputting section 2 is a reading means that optically reads the image of an original, and comprises a light source for emitting light to the original for reading, and an image sensor such as a CCD (Charge Coupled Device). In the image inputting section 2, a reflected light image from the original set in a prescribed reading position is formed on the aforementioned image sensor, and an analogue electrical signal of RGB (R: Red, G: Green, B: Blue) is outputted. The analogue electrical signal outputted by the image inputting section 2 is inputted in the image processing section 3.

The image processing section 3 generates image data of digital format based on the analogue electrical signal inputted through the image inputting section 2, and after executing the processing in accordance with the kind of the image, generates the image data for output. The image data thus generated is outputted to the image outputting section 4. In this embodiment, the image processing section 3 determines whether or not the characters or graphics included in the inputted image are prepared by handwriting, and performs image processing in accordance with the determination result.

For example, when it is so determined that the characters or graphics are prepared by handwriting, the scribble or the like can be deleted by deleting the characters or graphics, and only the area including the typed characters can be remained. Also, when it is so determined that the characters or graphics are prepared by handwriting, by changing the pixel values constituting the characters and graphics, the handwritten part can be enhanced. Further, when it is so determined that the characters or graphics are prepared by handwriting, by performing the character recognition and replacing the objects to be determined with the recognized characters, the handwritten characters can be replaced with the typed characters. Meanwhile, when it is so determined that the characters or graphics are not prepared by handwriting, the edge enhancement process is applied to the characters or graphics, thereby making it easy to observe an output image.

It should be noted that the characters or graphics prepared by handwriting are generally referred to as a handwritten image, and the characters or graphics not prepared by handwriting such as typed characters and vector image, etc, are generally referred to as a non-handwritten image.

The image outputting section 4 forms an image on sheet such as paper or an OHP film based on the image data outputted from the image processing section 3. Therefore, the image outputting section 4 comprises a photoreceptor drum, a charger for charging the photoreceptor drum to a predetermined potential, a laser writing device for generating an electrostatic latent image on the photoreceptor drum by emitting laser beam in accordance with the image data received from outside, a developing unit that feeds toner to the electrostatic latent image formed on the surface of the photoreceptor drum to visualize it, and a transferring unit (not shown) that transfers on the paper a toner image formed on the surface of the photoreceptor drum, and the image desired by the user is formed on the sheet by an electrophotographic system. It should be noted that the image may be formed by an ink jet system, a thermal transfer system, and a sublimation system, etc, in addition to forming the image by the electrophotographic system wherein the laser writing device is used.

In this embodiment, the image inputting section 2 is constructed as a reading means that optically reads the image of the original, and the image outputting section 4 is constructed as an image forming means that forms the image on the sheet. However, the image inputting section 2 may be constructed as a receiver that receives the image data from outside, and the image outputting section 4 is constructed as a transmitter that transmits the image data after being processed by the image processing section 3, to the outside.

Hereafter, the process performed in the image processing section 3 will be specifically explained;

FIG. 2 is a schematic view showing an example of the image to be processed by the image processing section 3. The image shown in FIG. 2 includes the handwritten characters described as "rakugaki" as a handwritten image, and includes the typed characters formed over a plurality of lines as a non-handwritten image. Thus, when the handwritten characters are added to the original mainly composed of typed characters, a great difference is generated between a ratio occupied by the handwritten image and a ratio occupied by the non-handwritten image in an entire image. Accordingly, such a feature can be one determination reference for determining and extracting the handwritten image and the non-handwritten image.

Further, when the handwritten image and the non-handwritten image are compared, a great difference is observed in the density gradient of the edge. Here, the density gradient of the edge shows a degree of a density change when the image is scanned in the direction crossing the edge. FIGS. 3A and 3B are explanatory views explaining edges observed in the non-handwritten image and the handwritten image. FIG. 3A is an explanatory view of the non-handwritten image, and a typed character "2" is formed as an example of the non-handwritten image. When the density change is examined by scanning on the image in a direction shown by an arrow in the figure, a graph showing the density change as shown in the right side is obtained. Namely, when a distance on the image is taken on the abscissa axis, and a density is taken on the ordinate axis, the density change is expressed in such a way that the density is low at a start point of scan because of a displacement from the typed character portion, and the density becomes rapidly high at the point closer to the edge part of the typed character. The density is maintained in a high state in the typed character portion, while the density becomes rapidly low at the part closer to the opposite side of the edge. In this way, the non-handwritten image such as typed characters has a steep edge regarding the density.

Meanwhile, FIG. 3B is an explanatory view of the handwritten image, and a character "ra" is described as an example of the handwritten image. When the density change is examined by scanning on the image in a direction shown by an arrow, the graph showing the same density change as in the case of the non-handwritten image is obtained. Similarly to the case of the non-handwritten image, the density change can be observed in the edge portion of the handwritten image. However, it is found that the density change becomes relatively loose, compared to the case of the non-handwritten image.

In this embodiment, the density gradient explained hereunder is introduced for quantitatively dealing with the degree of the density change of the edge portion. FIG. 4 is an explanatory view explaining the definition of the density gradient. When the coordinate (pixel value) of a start point of the edge is identified as x a, and the coordinate (pixel value) of an end point of the edge is identified as x b, and the density difference between these two points is identified as $f_D$, the density gradient G is defined as $f_D/|x_a-x_b|$. Although a calculation method of the density gradient G will be described in detail later, it can be calculated by detecting the start point of the edge and the density at the start point, and the end point of the edge and the density at the end point. Therefore, the feature of the edge can be extracted by a significantly simple calculation.

Figure 5:
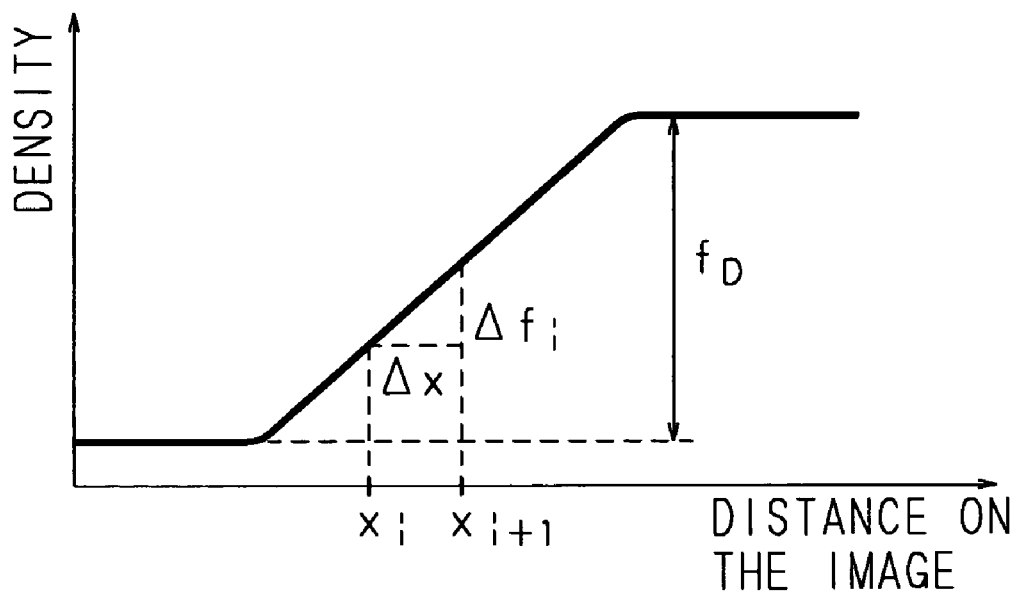
FIG. 5 is an explanatory view explaining the definition of an acutance.

In addition, the acutance as will be explained hereunder may be introduced. FIG. 5 is an explanatory view explaining the definition of the acutance. The acutance is a value obtained by normalizing a square mean value of density average by the gray level of the edge, and is defined by the formula expressed in FIG. 5. Here, n is the number of the coordinate (pixel) constituting the edge, and $\Delta x$ shows a distance between adjacent coordinates, $\Delta f_i$ shows the density difference between the adjacent coordinates. When compared to the aforementioned calculation method of the density gradient G, the procedure becomes slightly complicated, but the determination can also be performed based on such an acutance.

Figure 6:
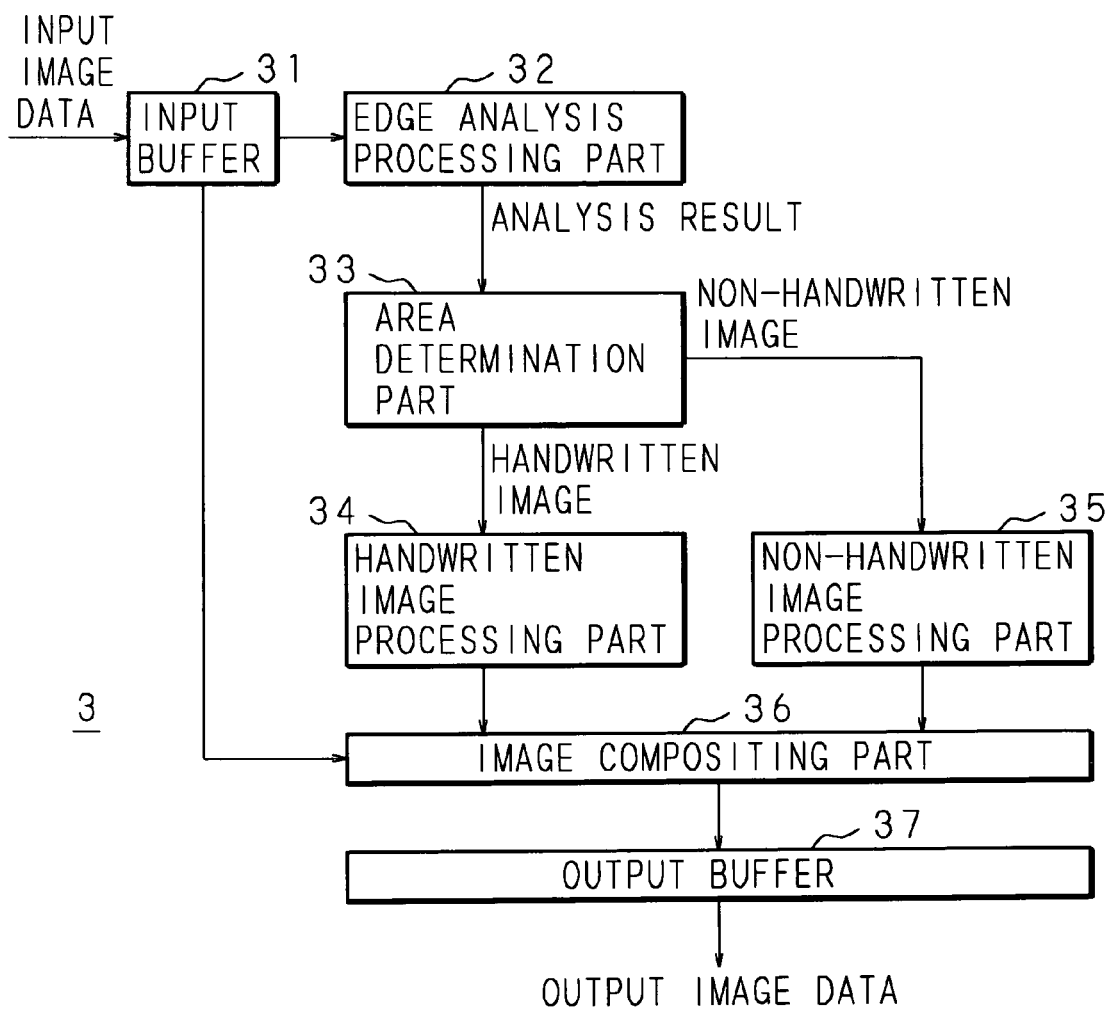
FIG. 6 is a block diagram showing an internal construction of the image processing apparatus.

FIG. 6 is a block diagram showing the internal construction of the image processing section 3. The image processing section 3 comprises an input buffer 31, an edge analysis processing part 32, an area determination part 33, a handwritten image processing section 34, a non-handwritten image processing section 35, an image compositing part 36, and an output buffer 37.

The input buffer 31 temporarily holds the image data outputted from the image inputting section 2. The image data held by the input buffer 31 is sent to the edge analysis processing part 32 and the image compositing part 36. The edge analysis processing part 32 performs an edge analysis of the inputted image data. Specifically, the edge analysis processing part 32 scans on an entire image based on the image data thus inputted, and sequentially extracts the density gradient of the edge of the characters and graphics included in the image.

The area determination part 33 determines whether or not the area surrounded by the edge extracted based on an analysis result by the edge analysis processing part 32 is prepared by handwriting or non-handwriting. The handwritten image processing section 34 applies a proper processing to the handwritten image, and sends it to the image compositing part 36. Also, the non-handwritten image processing section 35 applies a proper processing to the non-handwritten image, and sends it to the image compositing part 36. The image compositing part 36 composites the image by imposing the image processed by the handwritten image processing section 34 and the non-handwritten image processing section 35 to an original image. The image data obtained by image compositing is sent to the output buffer 37 and is held by the output buffer 37.

Hereunder, the procedure of the process executed by the image outputting apparatus will be explained.

Figure 7:
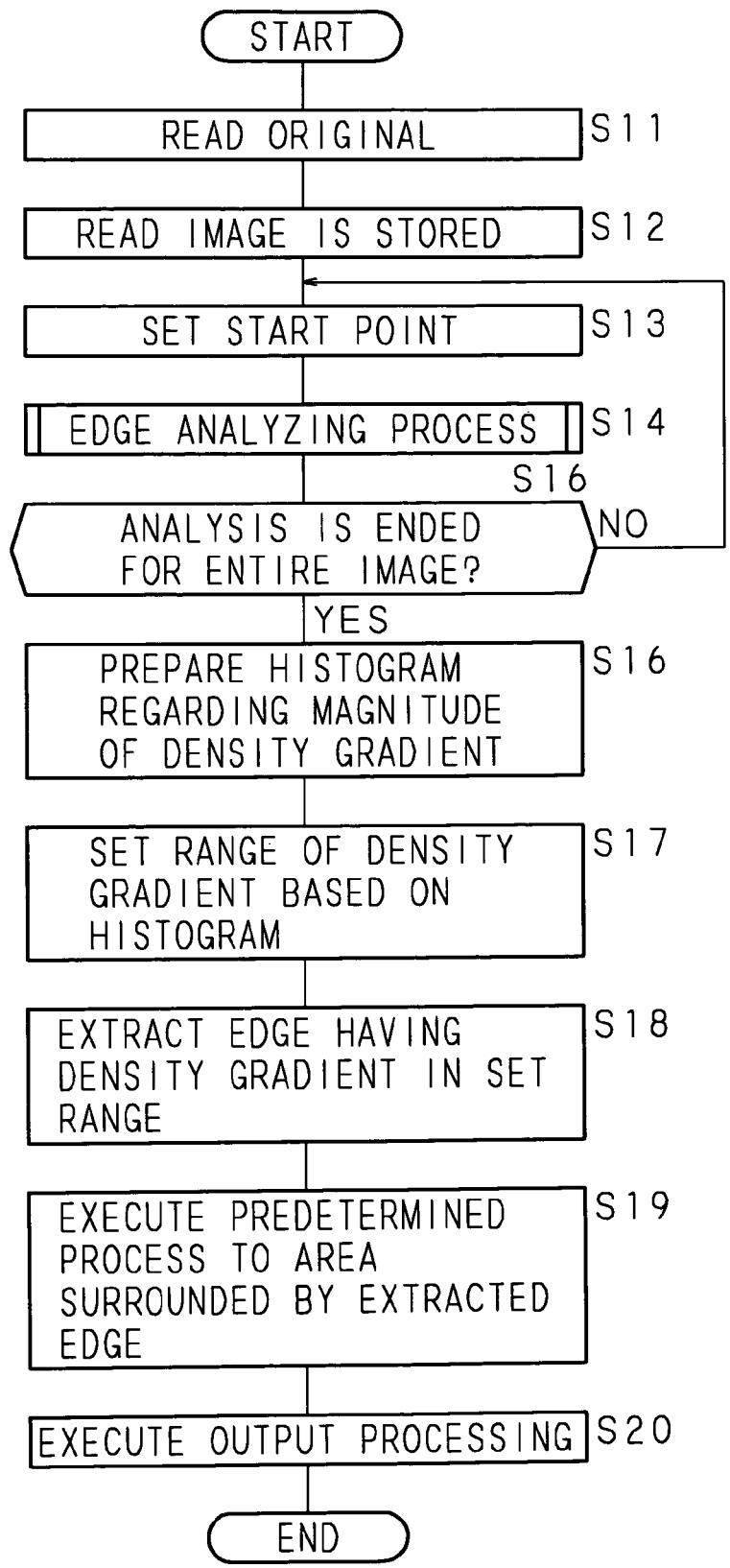
FIG. 7 is a flowchart explaining a procedure of process executed by the image outputting apparatus.

FIG. 7 is a flowchart explaining the procedure of the process executed by the image outputting apparatus. The image outputting apparatus, first, causes the image inputting section 2 to read the original (step S11). The image obtained by reading the original is outputted to the image processing section 3, and is stored in the input buffer 31 of the image processing section 3 (step S12).

Next, the image processing section 3 sets the start point for scanning the entire image stored in the input buffer 31 (step S13). For example, the pixel of left upper corner of the image can be set as the start point. Then, the adjacent pixels are sequentially scanned from the start point thus set, and the edge analyzing process is executed (step S14).

Figure 8:
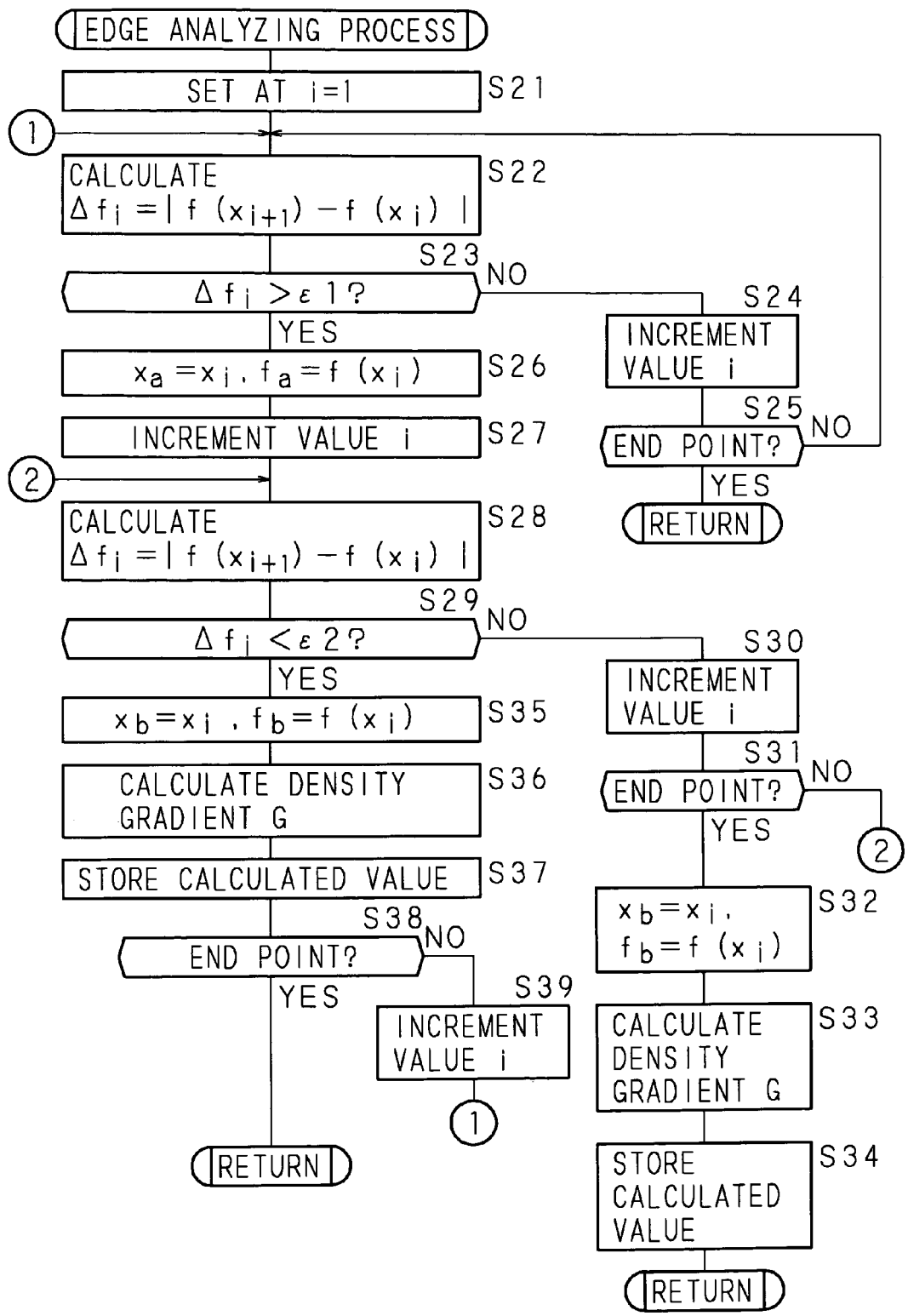
FIG. 8 is a flowchart explaining the procedure of process of an edge analyzing process.

FIG. 8 is a flowchart explaining the process procedure of the edge analyzing process. In executing the edge analyzing process, first, the image processing section 3 sets the value of a counter not shown in the figure at i=1 (step S21), and calculates the density difference $\Delta f_i = |f(x_{i+1}) - f(x_i)|$ between two adjacent pixels (step S22). Here, $x_i$, and $x_{i+1}$ show the pixel of i-th and i+1-th number, respectively, $f(x_i)$ and $f(x_{i+1})$ show the density of pixels $x_i$, and $x_{i+1}$, respectively.

Next, the image processing section 3 determines whether or not the density difference $\Delta f_i$ satisfies the condition of $\Delta f_i > \epsilon 1$ (step S23). Here, $\epsilon 1$ is a constant number, and a proper value is set for detecting the start point of rising (or falling) of the edge. By setting the $\Delta 1$ at a proper value, detection of noise or the like of the image can be prevented. When it is determined that the value of the density difference $\Delta f_i$ thus calculated is $\epsilon 1$ or less (S23: NO), the image processing section 3 increments the value i of a counter (step S24), and determines whether or not the pixel during analysis is the end point (step S25). Whether or not it is the end point is determined by determining whether or not the pixel during analysis corresponds to the pixel of the right end of the image, for example. When it is determined to be the end point (S25: YES), the processing by this flowchart is ended, and the processing is returned to the flowchart shown in FIG. 7. When it is determined not to be the end point (S25: NO), the processing is returned to the step S22 by the image processing section 3.

When it is determined that the density difference $\Delta f_i$ calculated in the step S22 is larger than $\Delta 1$ (S23: YES), it is determined to be the start point of the rising (or falling) of the edge, and values of the pixel $x_i$ and the density $f(x_i)$ are respectively substituted for x a and f a, and held therein (step S26).

Next, the image processing section 3 increments the value i of the counter (step S27), and calculates the density difference $\Delta f_i = |f(x_{i+1}) - f(x_i)|$ between two adjacent pixels (step S28). Then, the image processing section 3 determines whether or not the calculated density difference $\Delta f_i$ satisfies the condition of $\Delta f_i < \epsilon 2$ (step S29) to determine whether or not it is the end point of the rising (or falling) of the edge (step S29). Here, $\epsilon 2$ is a constant value, and a proper value is set for detecting the end point of the rising (or falling) of the edge.

When it is determined that the value of the calculated density difference $\Delta f_i$ is smaller than $\epsilon 2$ (S29: YES), it is determined to be the end point of the rising (or falling) of the edge, and the values of the pixel x i and the density $f(x_i)$ are substituted for x b, f b, and held (step S35). Then, the image processing section 3 calculates the density gradient $G = |(f_b - f_a)/(x_b - x_a)|$ by using the values $x_b$ and $f_b$ held in the step S35 (step S36), and stores the calculated value of the density gradient G (step S37).

Next, the image processing section 3 determines whether or not the pixel during analysis is the end point (step S38). Whether or not it is the end point is determined by determining whether or not the pixel during analysis corresponds to the pixel of the right end of the image, for example. When it is determined to be the end point (S38: YES), the processing by this flowchart is ended, and the processing is returned to the flowchart shown in FIG. 7. Also, when it is determined not to be the end point (S38: NO), the image processing section 3 increments the value i of the counter (S38: NO), and processing is returned to the step S22.

Meanwhile, when it is determined that the density difference $\Delta f_i$ calculated in the step S28 is larger than $\epsilon 2$ (S29: NO), the value i of the counter is incremented (step S30), and the image processing section 3 determines whether or not the pixel during analysis is the end point (step S31). Whether or not it is the end point is determined by determining whether or not the pixel during analysis corresponds to the pixel of the right end of the image, for example. When it is determined not to be the end point (S31: NO), namely, when the pixel during analysis is located in the midway of the rising (or falling) of the edge, and when it is determined that the analysis should be continued, the processing is returned to the step S28 by the image processing section 3. When it is determined to be the end point (S31: YES), namely, when it becomes the end point in the midway of the rising (or falling) of the edge, the values of the pixel $x_i$ and the density $f(x_i)$ are respectively substituted for $x_b$ and f b and held by the image processing section 3 (step S32). Then, the values x a and f a held in the step S26 and the values $x_b$ and $f_b$ held in the step S32 are used to calculate the density gradient $G = |(f_b - f_a)/(x_b - x_a)|$ (step S33), and the value of the density gradient G thus calculated (step S34) is stored. After the value of the density gradient G is stored, the processing is returned to the flowchart shown in FIG. 7 by the image processing section 3.

Figures 9A, 9B:
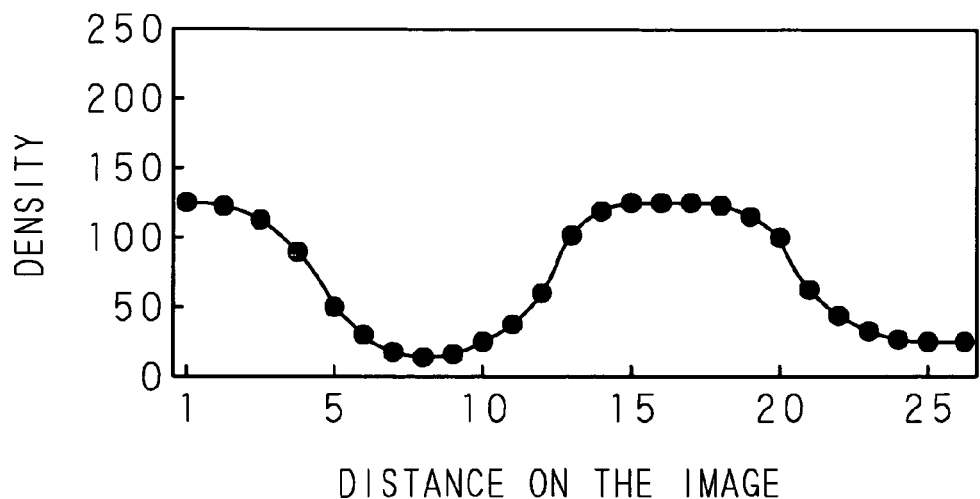
FIGS. 9A, and 9B are explanatory views explaining a calculation example of the density gradient.

FIGS. 9A and 9B, and FIGS. 10A and 10B are explanatory views explaining a calculation example of the density gradient G. When scanned on the image, a density distribution as shown in FIG. 9A is obtained, and an explanation is given to a case in which the density $f(x_i)$ in each pixel $x_i$ becomes the value shown in FIG. 9B. As described before, when the relation is set as $\epsilon 1 = \epsilon 2 = 5$, it is found that $x_i = 10$ becomes the start point of the edge, and $x_i = 14$ becomes the end point of the edge in this area. Since the density of the pixel x a of the start point is 20, and the density of the pixel x b of the end point is 118, the magnitude of the density gradient G is $(118-20)/(14-10) \sim 25$.

Figures 10A, 10B:
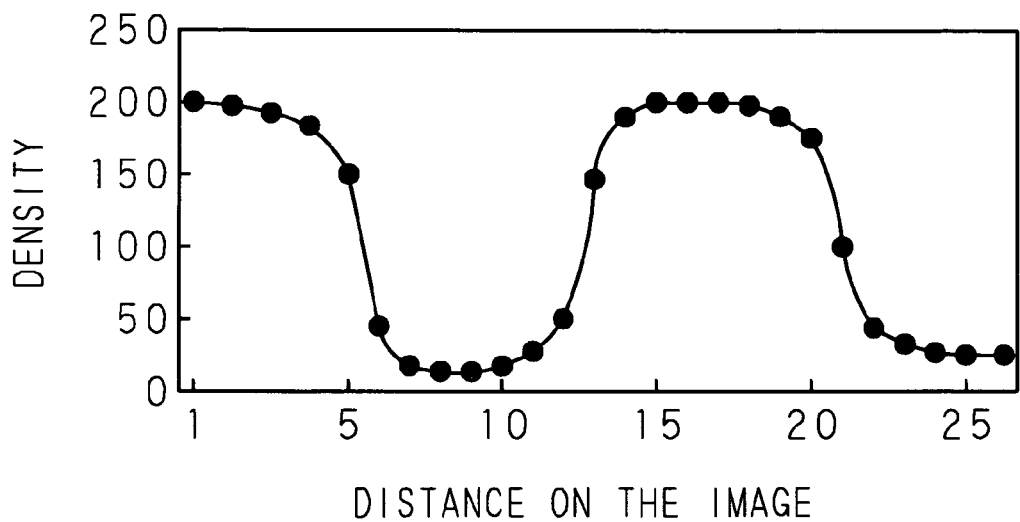
FIGS. 10A and 10B are explanatory views explaining the calculation example of the density gradient.

Similarly, when scanned on the image, the density distribution as shown in FIG. 10A is obtained, and an explanation will be given to a case in which the density $f(x_i)$ in each pixel $x_i$ becomes the value shown in FIG. 10B. As described before, when the relation is set as $\epsilon 1 = \epsilon 2 = 5$, it is found that $x_i = 11$ becomes the start point of the edge, and $x_i = 15$ becomes the end point of the edge in this area. Accordingly, since the density of the pixel $x_a$ of the start point is 24, and the density of the pixel x b of the end point is 203, the magnitude of the density gradient G becomes $(203-24)/(15-11) \sim 45$.

After the edge analyzing process is performed in the step S14 of the flowchart shown in FIG. 7, the image processing section 3 determines whether or not the analysis of the edge is ended for the entire image (step S15). When the analysis is performed by setting the left upper corner of the image as the start point, the right lower corner of the image can be the end point of the analysis, and by determining whether or not the pixel during analysis corresponds to the right lower corner of the image, whether or not the analysis of the entire image is ended can be determined. When it is determined that the analysis is not ended (S15: NO), the processing is returned to the step S13, and the start point is set to the next analysis position to continue the edge analyzing process (S14).

Figure 11:
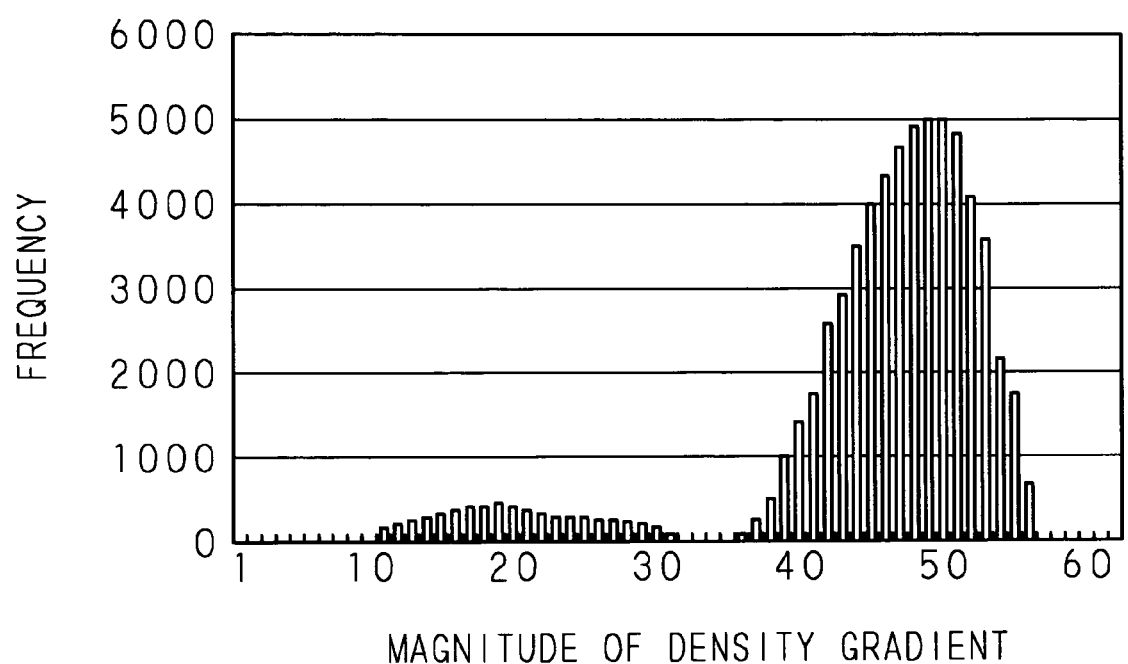
FIG. 11 is a schematic view showing an example of a histogram to be prepared.

When it is determined that the analysis for the entire image is ended (S15: YES), the image processing section 3 prepares a histogram regarding the magnitude of the density gradient extracted by the edge analyzing process (step S16). FIG. 11 is a schematic view showing an example of the histogram to be prepared. The magnitude of the density gradient is taken on the abscissa axis, and the appearance frequency with respect to the magnitude of each density gradient is taken on the ordinate axis. When the histogram is prepared by capturing the image of a partially scribbled original and performing the edge analysis, the histogram formed of a first distribution and a second distribution is obtained as shown in FIG. 11. The first distribution has a peak of the appearance frequency in a place where the magnitude of the density gradient is relatively small, and the second distribution has a peak of the appearance frequency in a place where the magnitude of the density gradient is relatively large. Specifically, when the following two points are taken into consideration, such as the point that a difference in the magnitude of the density gradient of the edge can be observed between a handwritten part such as a scribble and a typed character, and the point that a ratio of the edge forming the scribble becomes smaller when the scribble is present in a part of the original, it can be determined that the aforementioned first distribution is the distribution obtained by detecting the edge of the handwritten part, and the second distribution is the distribution obtained by detecting the edge of the typed character.

Figure 12A:
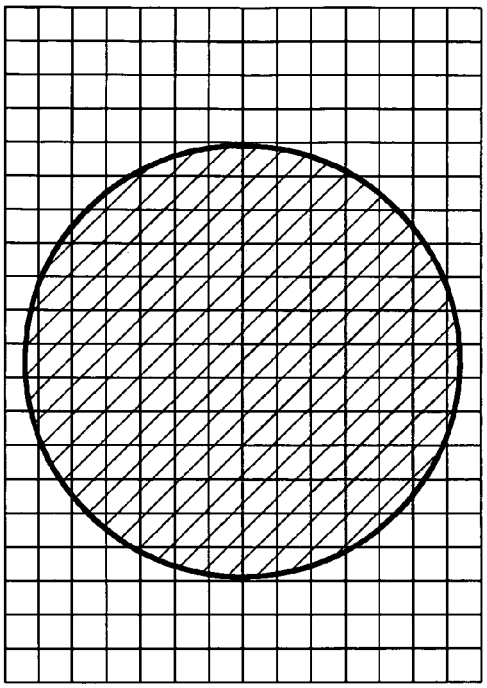
FIGS. 12A to 12D are explanatory views schematically showing an extraction result of the edge.
Figure 12B:
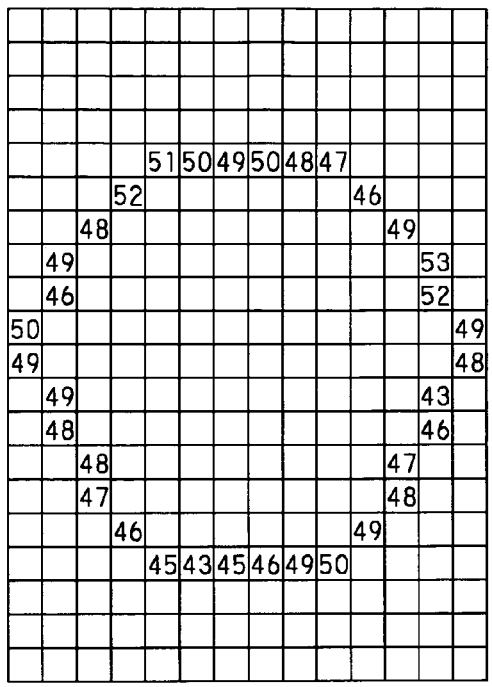
Figure 12C:
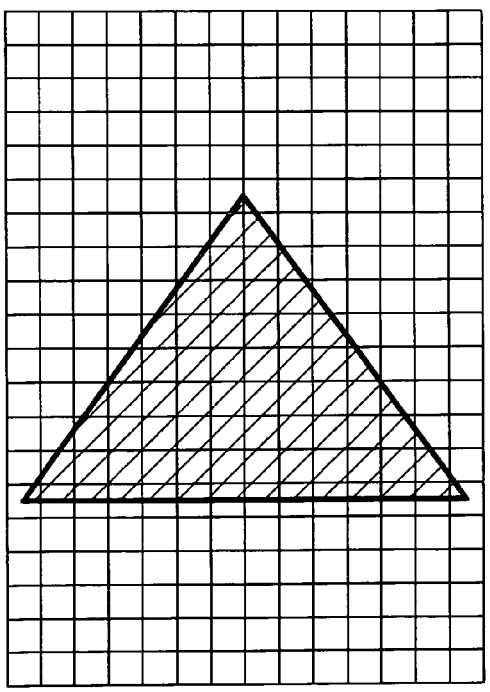
Figure 12D:
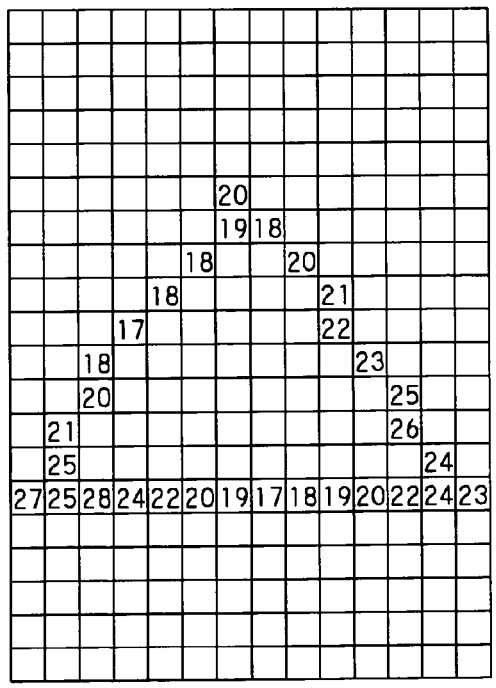

Accordingly, by setting the range of the density gradient (step S17) based on the histogram thus prepared, and extracting the edge having the density gradient in the range thus set (step S18), it becomes possible to discriminate and extract the edge of the handwritten image and the edge of the non-handwritten image. According to the example shown in FIG. 11, for example, by extracting the edge in the range of the magnitude of the density gradient from 35 to 60, the edge of the non-handwritten image can be extracted, and by extracting the edge of the magnitude of the density gradient from 10 to 32, the edge of the handwritten image can be extracted. FIGS. 12A to D are explanatory views schematically showing an extraction result of the edge. As a result of analyzing the edge of the graphic as shown in FIG. 12A, when the edge having the magnitude of the density gradient shown in FIG. 12B is extracted, this edge can be determined to be the edge of the non-handwritten image. Meanwhile, as a result of analyzing the edge of the graphic shown in FIG. 12C, when the edge having the magnitude of the density gradient as shown in FIG. 12D is extracted, this edge can be determined to be the edge of the handwritten image.

Next, the image processing section 3 applies a predetermined processing to the area surrounded by the extracted edge (step S19). For example, in regards to the area determined to be the handwritten image, by changing the pixel value of the pixel in the area to the pixel value corresponding to background color, the handwritten image can be deleted. Also, in regards to the area determined to be the non-handwritten image, by executing the edge enhancement process, an output image can be made easy to be observed. FIG. 13 shows a schematic view of the image obtained by extracting the edge from the image shown in FIG. 2, and FIG. 14 shows the schematic view of the image applied with the image processing based on the determination result.

It should be noted that the process executed by the image processing section 3 after the process of determining whether or not the objects to be determined are prepared by handwriting may be previously defined in the apparatus or may be selected by the user through the operating section 6.

The controller 1 takes out the image data processed by the image processing section 3 from the output buffer 37, transfers it to the image outputting section 4, and executes output processing (step S20).

Embodiment 2

The embodiment 1 is constituted so that the handwritten image and the non-handwritten image are separated and extracted by analyzing the entire image and preparing the histogram regarding the magnitude of the density gradient of the edge. However, it may also be constituted so that the threshold value is previously set to the magnitude of the density gradient, and the edge having a smaller density gradient than this threshold value is determined to be the edge of the handwritten image, and the edge having a larger density gradient than the threshold value is determined to be the edge of the non-handwritten image. It should be noted that the construction of the hardware of the image outputting apparatus according to this embodiment is the same as the construction of the image outputting apparatus shown in the embodiment 1.

Figure 15:
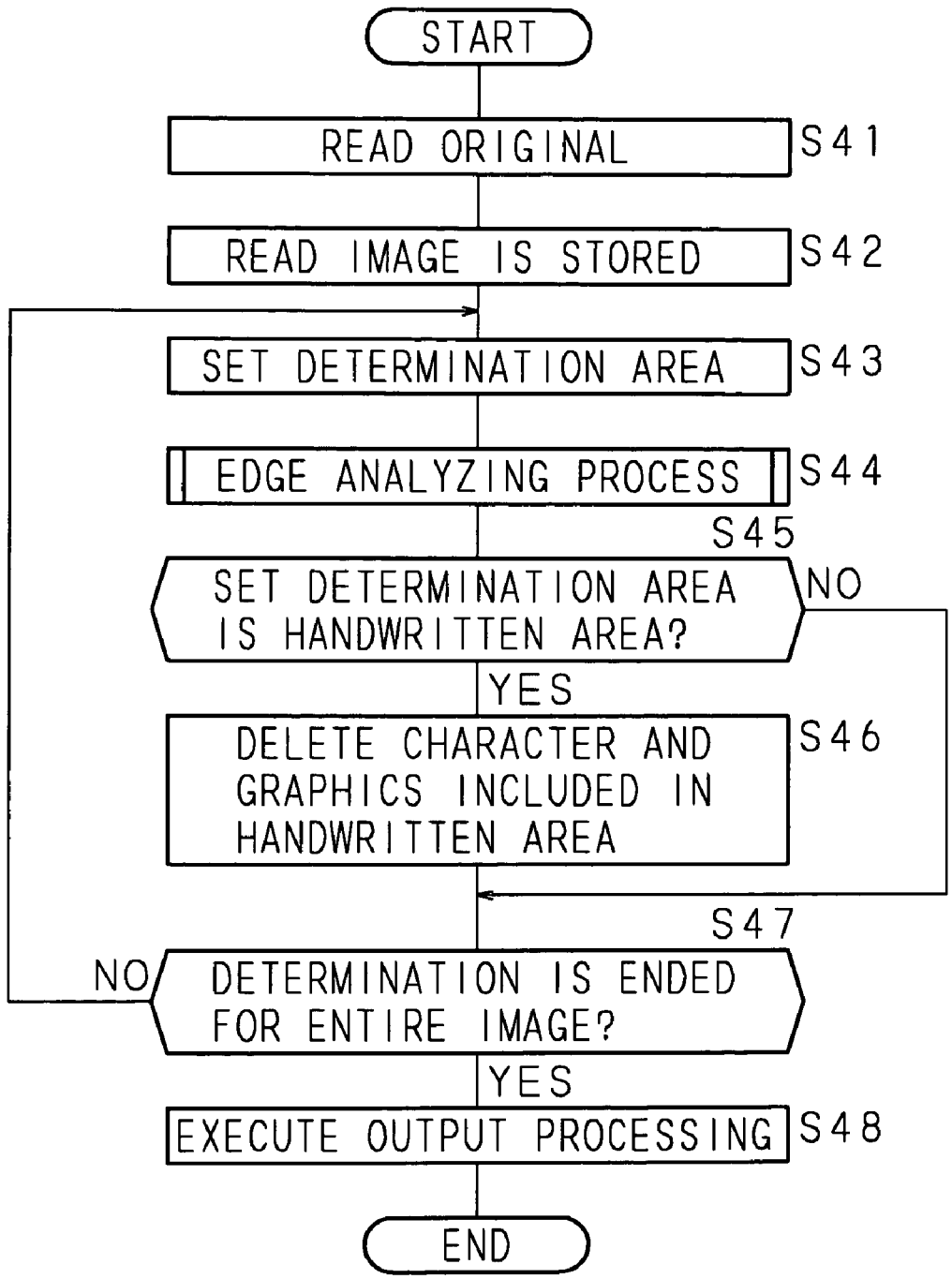
FIG. 15 is a flowchart explaining the procedure of the process executed by the image outputting apparatus according to this embodiment.

FIG. 15 is a flowchart explaining the procedure of the process executed by the image outputting apparatus according to this embodiment. The image outputting apparatus first reads the original by the image inputting section 2 (step S41). The image captured by reading the original is outputted to the image processing section 3, and stored in the input buffer 31 of the image processing section 3 (step S42).

Next, the image processing section 3 sets a determination area (step S43). Here, the determination area refers to the area determining whether or not the characters, graphics or a part of them included in the area are prepared by handwriting. The area of M×N pixel (M and N are integers of 1 or more, however M=N≠1) can be selected to be the determination area. Here, a given value may be used for the values of M and N, or a proper value may be set in accordance with the original already read.

Next, the image processing section 3 performs the edge analyzing process regarding the set determination area (step S44). The procedure of the edge analyzing process is completely the same as that explained in the embodiment 1. After the edge analyzing process is performed, the image processing section 3 determines whether or not the set determination area is a handwritten area (step S45). The determination is performed as follows. In the edge analyzing process, the edge of the characters or graphics included in the determination area is extracted, and the density gradient of the edge thus extracted is calculated. The characters and graphics prepared by handwriting have a property that the density gradient is relatively loose, and the typed characters have a property that the density gradient is relatively steep. Therefore, both of them can be determined by providing the threshold value to the density gradient. Namely, as a result of analysis by the edge analyzing process, when it is determined that the edge having a larger density gradient than the threshold value is included in the determination area, it can be determined that the determination area is a non-handwritten area. Also, when the edge is extracted by the edge analyzing process, and when the edge having a larger density gradient than the threshold value is not included, it can be determined that the determination area is the handwritten area.

When it is determined that the determination area is the handwritten area (S45: YES), the image processing section 3 deletes the characters and graphics included in the handwritten area (step S46). For example, by changing the pixel value of the pixel constituting the characters and graphics included in the handwritten area, to the pixel value corresponding to the background, they can be deleted.

When the characters and graphics included in the handwritten area are deleted (S46), or when it is determined that the determination area is not the handwritten area in the step S45 (S45: NO), the image processing section 3 determines whether or not the determination is ended for the entire image (step S47). When the determination is sequentially performed from the left upper corner of the image and is performed up to the right lower corner finally, by determining whether or not the pixel of the right lower corner of the image is included in the determination area set in the step S43, it can be determined whether or not the determination is ended for the entire image. When it is determined that the determination is not ended for the entire image (S47: NO), the processing is returned to the step S43 by the image processing section 3. Also, when it is determined that the determination is ended for the entire image (S47: YES), the image processing section 3 outputs the processed image data to the image outputting section 4. The image outputting section 4 executes output processing based on the image data outputted from the image processing section 3 (step S48).

Embodiment 3

The embodiment 2 is constructed so that the characters and graphics included in the handwritten area are deleted, and the characters and graphics included in the non-handwritten area are not processed. However, it may also be constructed so that the process to be executed for each area is selected by a user. Note that the construction of the hardware of the image outputting apparatus according to this embodiment is the same as the image outputting apparatus shown in the embodiment 1.

Figure 16:
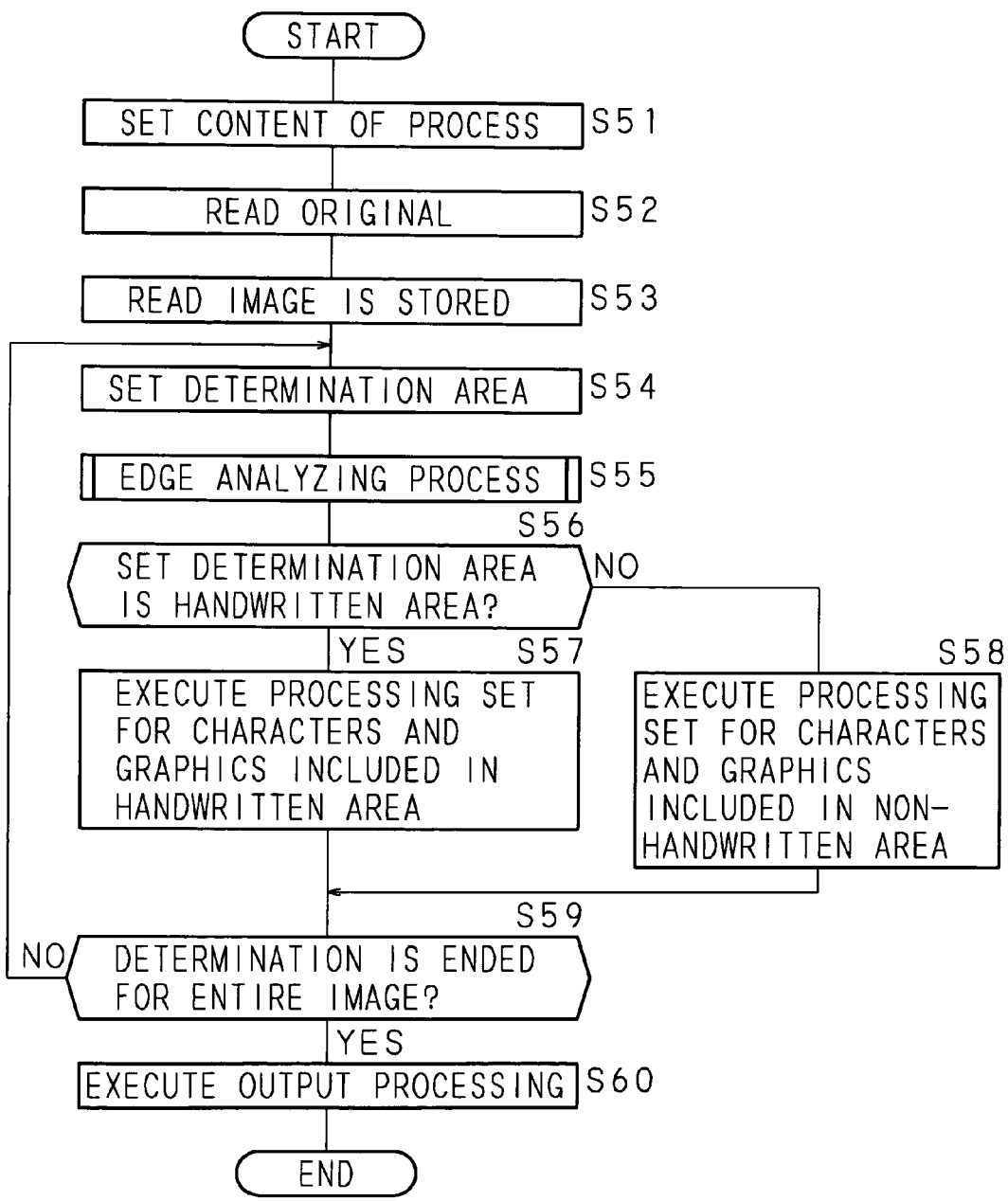
FIG. 16 is a flowchart explaining the procedure of the process executed by the image outputting apparatus according to this embodiment.

FIG. 16 is a flowchart explaining the procedure executed by the image outputting apparatus according to this embodiment. The image outputting apparatus first receives a setting of process content through the operating section 6 (step S51). For example, it may be so constituted that an operating button corresponding to the process content is provided in the operating section 6, and when this operating button is pressed and operated, the setting of the process content is received. It may also be so constituted that when the operating button provided in the operating section 6 is pressed and operated in a predetermined order, special process content is set. Alternately, it may be so constituted that a liquid crystal display having a touch panel is mounted on the operating section 6 to display the process content that can be set when the setting of the process content is received, and a selection is received through the touch panel.

Next, the image outputting apparatus causes the image inputting section 2 to read the original (step S52), and stores the captured image in the input buffer 31 of the image processing section 3 (step S53).

Next, the image processing section 3 sets the determination area (step S54), and performs the edge analyzing process for the determination area thus set (step S55). The determination are is the area composed of M×N-pixel (M and N are integers of 1 or more, however M=N≠1), and is the area for determining whether or not the characters, graphics, or a part of them included in the area are prepared by handwriting. The edge analyzing process is completely the same as that explained in the embodiment 1. After the edge analyzing process is performed, the image processing section 3 determines whether or not the determination area thus set is the handwritten area (step S56). The determination can be performed in the same way as the embodiment 2.

When it is so determined that the determination area is the handwritten area (S56: YES), the image processing section 3 executes the processing set for the characters and graphics included in the handwritten area (step S57). For example, when a deletion of the characters and graphics is set in the step S51, they are deleted by changing the pixel value constituting the characters and graphics included in the handwritten area to the pixel value corresponding to the background.

Meanwhile, when it is so determined that the determination area is not the handwritten area (S56: NO), the image processing section 3 executes the processing set for the characters and graphics included in the non-handwritten area (step S58). For example, when the edge enhancement process of the typed character portion is set in the step S51, the edge enhancement processing is applied to the determination area at this point.

After processing is applied to each area, the image processing section 3 determines whether or not the determination is ended for the entire image (step S59). When the image is sequentially determined from the left corner of the image, and is determined up to the right lower corner of the image finally, whether or not the determination for the entire image is ended can be determined by determining whether or not the image of the right lower corner of the image is included in the determination area set in the step S54. When it is determined that the determination for the entire image is not ended (S59: NO), the processing is returned to the step S54 by the image processing section 3. Also, when it is determined that the determination for the entire image is ended (S59: YES), the image processing section 3 outputs the processed image to the image outputting section 4. The image outputting section 4 executes output processing based on the image data outputted from the image processing section 3 (step S60).

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
an obtaining section for obtaining an image; and
a controller controlling operations of:
  extracting a magnitude of a density gradient G of a leading edge portion in a direction crossing the leading edge portion for characters or graphics included in an obtained image;
  determining whether or not the characters or graphics are prepared by handwriting based on the magnitude of the density gradient G thus extracted; and
  applying processing to the image in accordance with a result of the determining, wherein the density gradient G is defined as $f_D/|x_a-x_b|$ with $x_a$ being a start point of the leading edge portion and $X_b$ being an end point of the leading edge portion.

2. The image processing apparatus according to claim 1, said controller further controls an operation of:
applying an edge enhancement process to the determined characters or graphics when it is determined that the characters or graphics are not prepared by handwriting.

3. The image processing apparatus according to claim 1, said controller further controls an operation of:
changing a pixel value of the determined characters or graphics when it is determined that the characters or graphics are prepared by handwriting.

4. The image processing apparatus according to claim 1, said controller further controls operations of:
executing character recognition regarding the characters or graphics to be determined when it is determined that the characters or graphics to be determined are prepared by handwriting; and replacing the characters or graphics to be determined with recognized characters.

5. An image processing apparatus comprising:
an obtaining section for obtaining an image; and
a controller controlling operations of:
extracting a magnitude of a density gradient of a leading edge portion in a direction crossing the leading edge portion for characters or graphics included in an obtained image;
determining whether or not the characters or graphics are prepared by handwriting based on the magnitude of the density gradient thus extracted; and
applying processing to the image in accordance with a result of the determining, wherein the controller extracts the magnitude of the density gradient for a plurality of leading edge portions and said controller further controls operations of:
summarizing incidence of the leading edge portion having the same magnitude of a density gradient out of extracted leading edge portions; and
determining whether or not the characters or graphics to be determined are prepared by handwriting based on a result of the summarizing.

6. An image processing apparatus comprising:
an obtaining section for obtaining an image; and
a controller controlling operations of extracting a feature of an edge for characters or graphics included in an obtained image;
determining whether or not the characters or graphics are prepared by handwriting, based on the feature thus extracted;
applying processing to the image in accordance with a result of the determining, wherein the feature of the edge to be extracted is a magnitude of a density gradient G in a direction crossing the edge; and
a storage section for storing a threshold value for the magnitude of a density gradient G; further wherein
said controller controls operations of comparing the extracted magnitude of the density gradient G and the threshold value, and
when the extracted magnitude of the density gradient is smaller than the threshold value, it is determined that characters or graphics to be determined are prepared by handwriting, and further wherein
the density gradient G is defined as $f_D/|x_1-x_b|$ with $x_a$ being a start point of the leading edge portion and $X_b$ being an end point of the leading edge portion.

7. An image outputting apparatus comprising:
the image processing apparatus according to claim 1; and
an image outputting section for outputting an image processed by the image processing apparatus.

* * * * *